United States Patent
La Marre et al.

[15] 3,691,564
[45] Sept. 19, 1972

[54] PROTECTIVE GARMENT

[72] Inventors: David A. La Marre, Woodstock, Conn.; George H. Schauweker, Southbridge, Mass.; Herbert F. Stickney, North Woodstock, Conn.

[73] Assignee: American Optical Corporation, Southbridge, Mass.

[22] Filed: Nov. 4, 1970

[21] Appl. No.: 86,680

[52] U.S. Cl. ............... 2/2, 2/DIG. 1, 2/59, 2/81, 2/97
[51] Int. Cl. ............................................. A41d 13/00
[58] Field of Search ............ 2/2, 2.1 A, 2.1 R, 16, 22, 2/7, 81, 125, DIG. 1, 97, 59

[56] References Cited

UNITED STATES PATENTS

| | | | |
|---|---|---|---|
| 3,381,307 | 5/1968 | Shingler | 2/94 |
| 1,739,289 | 12/1929 | Carter | 2/1 X |
| 3,591,400 | 7/1971 | Palmquist et al. | 2/81 X |
| 3,425,060 | 2/1969 | Glaser et al. | 2/2.1 R |
| 3,093,830 | 6/1963 | Wills | 2/DIG. 6 |

FOREIGN PATENTS OR APPLICATIONS 1,124,442   3/1962   Germany ................ 2/2

Primary Examiner—Jordan Franklin
Assistant Examiner—George H. Krizmanich
Attorney—William C. Nealon, Noble S. Williams, Robert J. Bird and Bernard L. Sweeney

[57] ABSTRACT

A welder's jacket including a light colored main body portion having a flexible, detachable, highly reflective facing over substantially the entire front portion and forward exposed arm portions, and having a moisture absorptive thermally insulating body contacting portion.

10 Claims, 3 Drawing Figures

INVENTORS
David A. LaMarre
George H. Schauweker
Herbert F. Stickney
BY William C. Kealon
Attorney

PROTECTIVE GARMENT

BACKGROUND OF THE INVENTION

1. Field of the Invention

Protective garments with particular reference to welder's jackets.

2. Description of the Prior Art

Welder's jackets currently in use were developed about 15 to 30 years ago when welders were normally operating in the 100 to 150 ampere range and using separate welding rods. Many improvements in welding techniques have occurred since these earlier procedures.

Welding equipment now operates at voltages such that up to 15 to 20 kilowatts of power is dissipated in the welding operation, a large portion of which is emitted as radiant energy. Furthermore, separate welding rods have been commonly replaced by continuous wire welding techniques. In such cases a welder no longer has the luxury of stopping work every minute or so to change a rod and cool off.

Heretofor, the theory of welder's jackets tended to be primarily one of shielding with some secondary consideration given to insulation. A widely accepted choice for welder's garments has been leather which is quite durable to spatter and radiation. It incorporates a small amount of insulation effect from the nature of the material. Leather, however, tends to be heavy, hot and expensive. Another approach to the problem has been to use aluminized materials such as asbestos or rayon which will reflect a large fraction of welding radiation and hence reduce the amount of heat absorbed in the garment. These materials are heavy and do not have open pores which allow them to "breathe." Accordingly, they are uncomfortable to wear. While such jackets do protect welders from spatter and for a limited time do have reflective properties which deflect some heat away from the welders body, the latter quickly becomes diminished by accumulated spatter and soil.

In actual present day welding experiences, the welder is exposed to more light and heat near his work resulting from the use of higher welding amperages and inert gas shielding which tends to cut down on gas and smoke. This in turn, makes it difficult for members of the welding industry to interest workers in apprentice welding programs because of such working conditions. In this respect, it is statistically accurate to say the mean age of industrial welders is advancing every day because an alarmingly small number of young men are entering the profession.

According to the present invention, in addition to shielding the welder (the theory of prior art protection), there has been developed a well ventilated, lightweight industrial welder's garment which protects the welder by promoting heat rejection and a lessening of heat transfer through the garment.

SUMMARY OF THE INVENTION

A preferred embodiment of the invention comprises a welder's jacket having a white canvas duck main body portion arranged to protect the upper welder's body. It is arranged to cover the front of a wearer from his neck about down to his thighs. Included is a rear portion covering the wearer's shoulders but terminating about midway of his shoulder blades with the remainder of the back being open for ventilation. Further included is a pair of sleeves of the same white duck material joined to the main body portion about the shoulders and extending to or nearly to the wearer's wrist. The rear of each sleeve is open.

Extending about the front and sides of the main body and sleeves is a readily detachable lightweight, flexible and highly reflective metallic material. An eminently satisfactory form of this material is aluminized fiber glass reinforced mylar film. Aluminum foil may also be used. This material, being inexpensively disposable and eminently highly reflective to radiant energy, rejects welding heat keeping the jacket relatively cool which, in turn, being white or light in color, further rejects radiant energy from portions of the welder's body not covered by the reflective metallic material.

The jacket is lined with an open knit absorptive fabric similar to that used in thermal underwear, wherewith insulation from the main body portion of the jacket and absorption of perspiration is effected for additional body comfort during welding.

Being inexpensively disposable and readily replaceable, the metallic front and sleeve protectors are intended for immediate replacement upon undue soiling. This assures optimum rejection of heat at all times.

DESCRIPTION OF THE PREFERRED EMBODIMENTS

Figure 1:
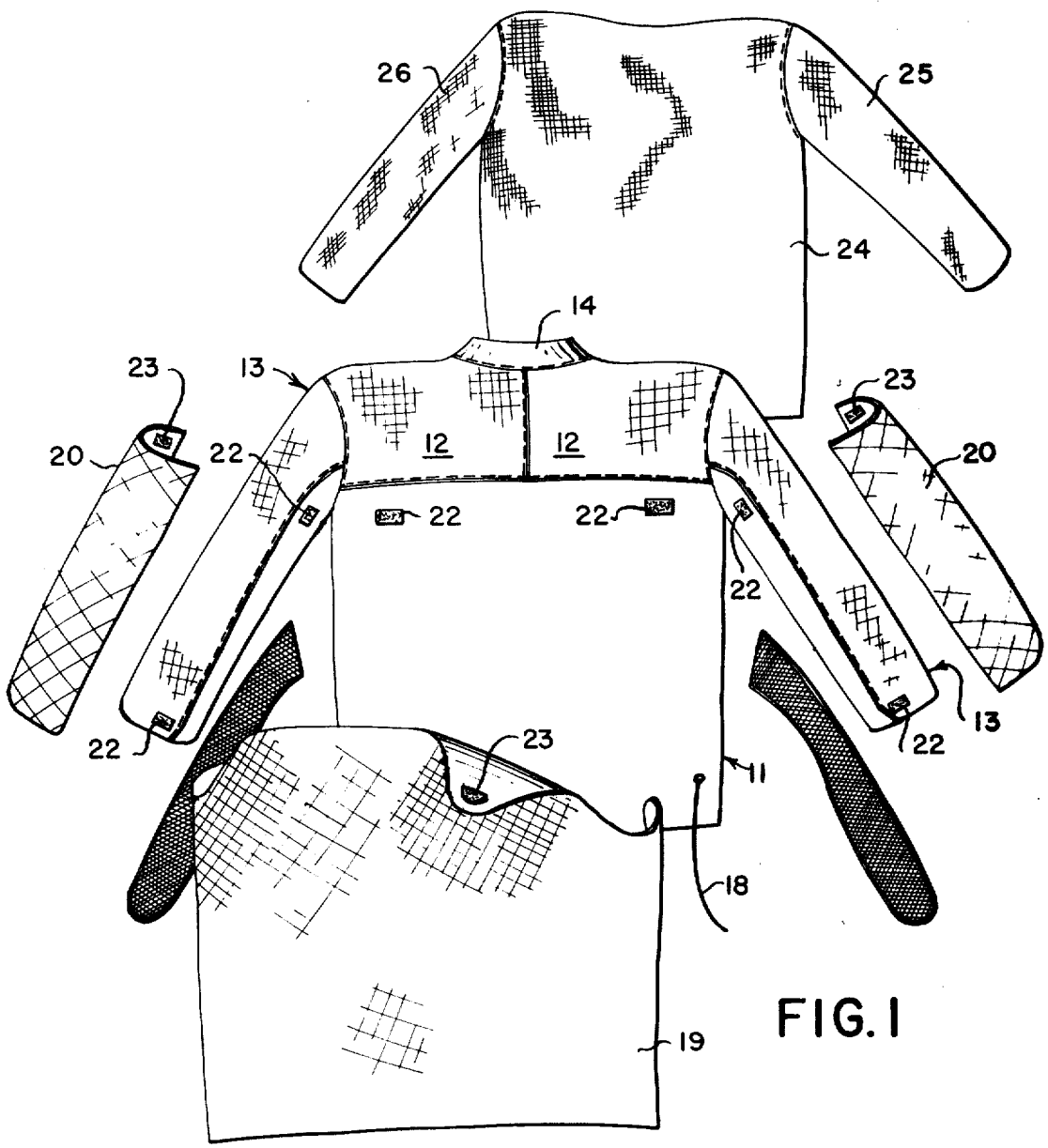
FIG. 1 is an exploded view of a preferred garment construction according to this invention.
Figure 2:
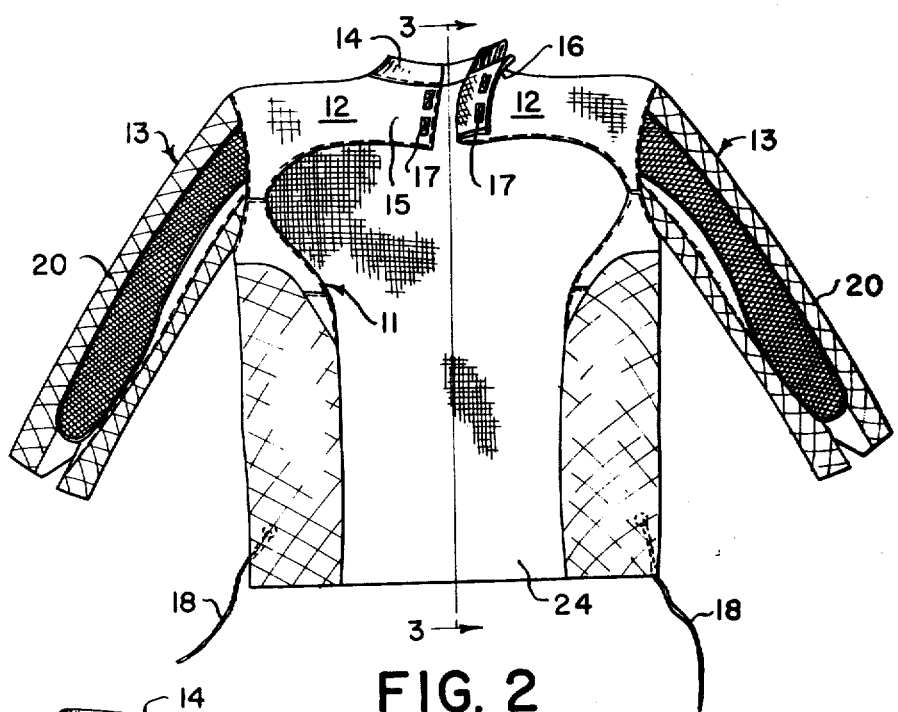
FIG. 2 is a rear view of the assembled garment of FIG. 1 showing shoulder and arm construction.
Figure 3:
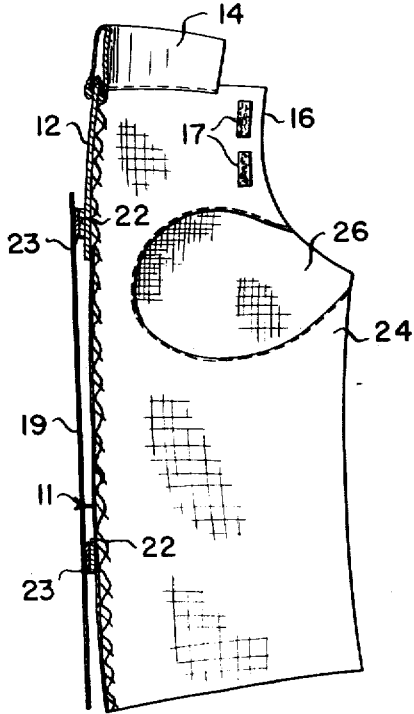
FIG. 3 is a vertical cross section of the garment taken along line 3—3 of FIG. 2.

Referring to FIGS. 1-3 which illustrate a preferred embodiment of the invention, the welding jacket comprises a main body 10 fabricated of white duck material, e.g. 100 percent cotton weighing 7½ ounces per square yard. Main body 10 consists of front panel 11, two shoulder panels 12 and sleeves 13, each of which extends rearwardly of the jacket to form a partial back thereof. Panels 11, 12 and sleeves 13 are stitched together, preferably with double seams. A neck opening having collar 14 is provided with overlapping sections 15 and 16 at the rear of the jacket. Complimentary strips 17 of releasably fastenable material are used to fasten section 15 and 16 together. A preferred embodiment of these strips 17 is a plastic hook and loop fastening material which when pressed together becomes fastened but may be stripped apart. Other fasteners may be used.

The turtle-neck collar 14 is desirable to prevent ultraviolet burning of the neck of a welder. However, other neck and collar designs may be used within the scope of this invention.

The rear of each of sleeves 13 is open from about the wrist to its respective shoulder seam (see FIG. 2). This opening in each case is preferably covered with a plastic screen or open mesh fabric or simply left open, i.e. without screening. In the latter case, however, elastic bands extending across the openings would normally be used to hold the sleeves in place upon a wearer's arms.

Suitable ties 18 may be arranged to pass over the back at about waist level to assist in holding the jacket on a wearer.

Over the major portion of the front panel 11 of main body 10 and each of sleeves 13 are coverings 19 and 20 respectively of disposable, highly reflective, flexible, metallic sheet material. This material may be metal foil, such as aluminum foil. A preferred embodiment, however, is a glass fiber reinforced metallized, non-combustible plastic. A "waffle" like surface is produced by sandwiching of the glass fibers.

Covering 19 extends from substantially the bottom of the jacket to a location at about the bottom of the sternum of a wearer when the jacket is in use. It has been determined to be important that the material not extend much higher. If it does, the wearer may become exposed to the reflection of undesirable ultraviolet rays which can cause burning of his face, chin, and neck. If the collar 14 extends high enough though, e.g. as a high "turtleneck," then the reflective material of covering 19 may extend higher since the collar will protect the wearer's neck and chin.

Covering 20 extends from just above the wrist to about tricep level and are so oriented on their respective sleeves as to cover those portions of a wearer's arm which would normally be exposed to the heat and radiation of a welding arc when in use.

In the preferred embodiments, the reflective coverings 19 and 20 are releasably secured to the jacket with the aforementioned non-metallic hook and loop fasteners which become attached when pressed together and may be easily stripped apart. These fasteners 22, where attached to panel 11 and sleeves 13, are quite large and the complimentary pieces 23 on the back faces of the reflective coverings 19 and 20 are relatively small. Preferably, the pieces on panel 11 and sleeves 13 would be about 1 inch square of 1 inch in diameter, if circular, and those on the coverings 19 and 20 would be in the order of one-half inch in diameter. This size difference is beneficial. It makes it easier to align the reflective coverings when replacement is necessary and allows for shrinkage of the jacket when it is washed.

An important feature of the construction is that the coverings 19 and 20 are flexible and attached at only a few points along the front and sleeves of the jacket. This permits a pumping of air to occur between the reflective coverings and the main body 10 of the jacket as a result of continuous movement of the wearer. The flow of cooling air behind coverings 19 and 20 enhances wearing comfort.

The reflective coverings 19 and 20 are inexpensively disposable whereby the adverse effects of soil and spattering which reduce and eventually eliminate reflectivity are quickly, effectively and inexpensively obviated.

Main body 10 is lined with thermally insulating material. An open knit absorptive fabric similar to that used in thermal underwear is preferred. This lining is provided in sections 24, 25 and 26. Section 24 covers the front of a wearer's body and sections 25 and 26 cover the front of each of his arms. This material provides a plurality of small pockets of air to form an insulating layer next to the wearer's body. It also absorbs perspiration moisture for physical comfort and, through movement of the wearer, air is caused to circulate over this material to effect cooling through evaporation of the perspiration moisture. The lining is affixed only at spaced points about its periphery thus allowing movement thereof toward and away from the main body 10 of the jacket which still further promotes a flow of air therethrough.

Referring to FIG. 2, the invention features rearward exposure of the arm pit of a wearer. While protecting the arms from harmful radiation and heat, this exposure enhances the aforementioned body cooling.

It should be understood that materials other than those described hereinabove may be used according to the present invention. For example, plastic snap fasteners can be substituted for fasteners 16, 17, 22 and 23. Material other than white duck can also be used if it is light in color and/or not readily absorptive to heat.

Synthetic fiber material or sheets of plastic foam materials may be substituted for lining 24, 25 and 26. It is also contemplated that a porous insulating layer of a foam plastic or its equivalent and a perspiration absorbing fabric layer against a wearer's body be used whenever such added insulation is desired.

We claim:

1. A welder's jacket comprising the combination of:
   a main body having front, shoulder and sleeve sections of flexible material, said material being characteristically durable and notably reflective to radiant energy;
   a flexible liner in said front, shoulder and sleeve sections, said liner being moisture-absorbant and thermally insulating; and
   disposable coverings of flexible heat-reflecting sheet material, one detachably connected in spaced relationship to each of said front and sleeve sections of said main body for affording circulation of ambient air between said main body and coverings during use of the jacket.

2. A welder's jacket according to claim 1 wherein said spaced relationship of said disposable coverings extends throughout at least the major portion of the expanse of each covering and opens outwardly thereof substantially completely about the respective peripheral portions of the coverings.

3. A welder's jacket according to claim 2 wherein outwardly and inwardly projecting disconnectable fastening means are provided on said sections of said main body and said disposable coverings respectively for detachably connecting each of the latter in said spaced relationship to said main body of said jacket.

4. A welder's jacket according to claim 1 wherein said disposable coverings are formed of a metallized, thin sheet plastic material.

5. A welder's jacket according to claim 3 wherein said disposable coverings are formed of a metallized thin sheet plastic material.

6. A welder's jacket according to claim 1 wherein said disposable coverings are formed of a metallic foil.

7. A welder's jacket according to claim 3 wherein said disposable coverings are formed of a metallic foil.

8. A welder's jacket according to claim 1 wherein said flexible liner is formed of a loose-knit, moisture-absorbent fabric.

9. A welder's jacket according to claim 1 wherein said flexible liner comprises synthetic moisture-absorbant foam material.

10. A welder's jacket according to claim 1 wherein said flexible liner comprises a first layer of synthetic foam material and a second layer of loose-knit, highly moisture-absorbent fabric.

* * * * *